Patented Nov. 19, 1946

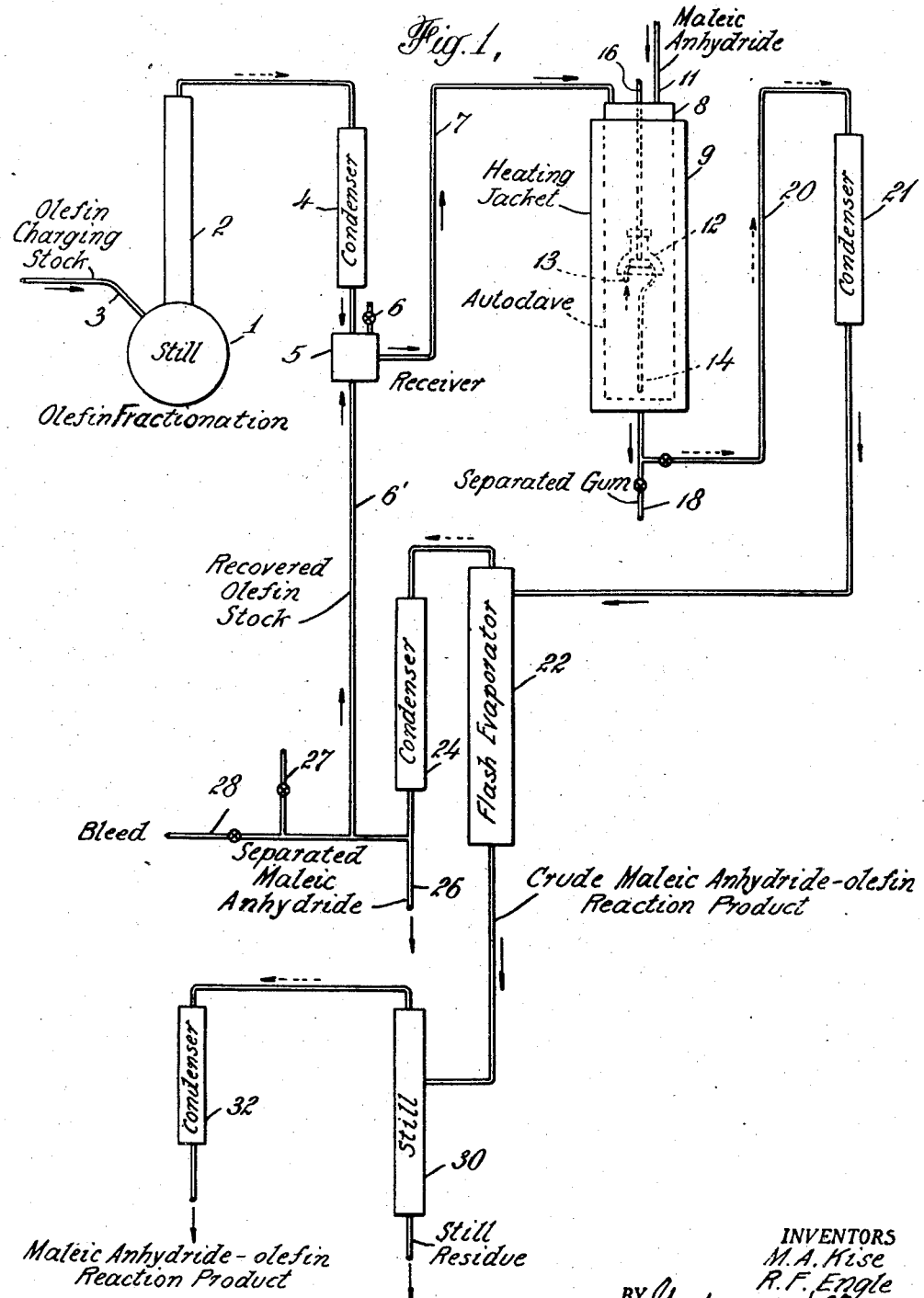

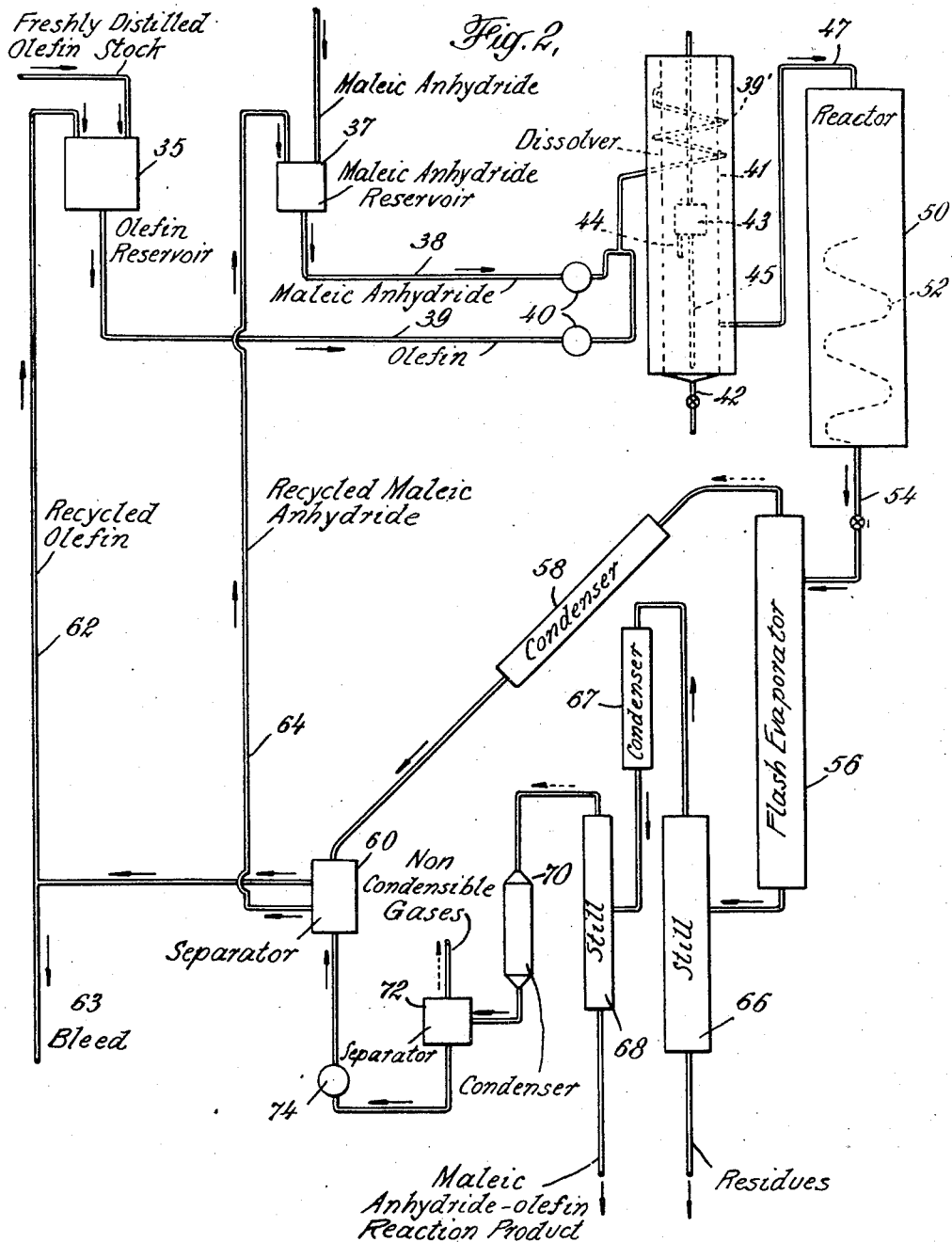

2,411,215

UNITED STATES PATENT OFFICE 2,411,215

PRODUCTION OF SUBSTITUTED SUCCINIC ANHYDRIDES

Mearl A. Kise and Robert F. Engle, Syracuse, N. Y., assignors to The Solvay Process Company, New York, N. Y., a corporation of New York Application January 14, 1943, Serial No. 472,350

4 Claims. (Cl. 260—342.4)

This invention relates to improvements in the manufacture of alkenyl succinic anhydrides.

Alkenyl succinic anhydrides may be synthesized by reacting together maleic anhydride and aliphatic mono-olefins such as those derived from petroleum hydrocarbons by cracking processes. In accordance with well known chemical laws it is desirable to employ relatively high reaction temperatures of about from 200° C. to 275° C., and pressure sufficient to maintain the olefins in the liquid phase at the reaction temperature in order to carry out the reaction rapidly. Effecting the synthesis by merely mixing olefinic cracked petroleum fractions with maleic anhydride and heating the mixture results in formation of substantial amounts of gum in the autoclave during the reaction, with resultant waste of reactants. Further, in carrying out the reaction, dangerous increases in pressure are prone to occur, which increases are attributable to side reactions, particularly decomposition of maleic anhydride, within the reaction zone.

It is an object of this invention to provide an improved process for the synthesis of alkenyl succinic anhydrides from aliphatic mono-olefins and maleic anhydride with materially reduced gum formation and more efficient utilization of maleic anhydride.

It is a further object of the invention to provide a process for reacting maleic anhydride with mixtures of aliphatic mono-olefins, such as those derived from petroleum hydrocarbons by cracking processes, smoothly and rapidly at relatively high temperatures without dangerous increases in pressure. Other objects and advantages will appear hereinafter.

In accordance with the invention, maleic anhydride is dissolved in aliphatic mono-olefin mixtures, such as olefinic mixtures of cracked petroleum origin, free from gums and oxygen compounds, under conditions such that substantial reaction of the anhydride with the olefins does not occur and when dissolution of the maleic anhydride is complete, the reaction is carried out relatively rapidly at a temperature above 200° C., preferably from 225° to 250° C. under sufficient pressure to maintain the olefins in the liquid phase. Ordinarily, a temperature of from 150° to 200° C. promotes dissolution of the maleic anhydride in the olefins at a satisfactory rate, i. e., a rate such that complete dissolution of the anhydride is effected within from 0.5 to 2 hours; at these temperatures reaction between the anhydride and olefins proceeds to only a small extent during such period. In order to effect complete dissolution of the maleic anhydride, the reaction mixture should contain at least 80 per cent, preferably 80 to 95 per cent by weight of hydrocarbons and not more than 20 per cent, preferably 5 to 20 per cent, by weight of the anhydride. The invention is advantageous chiefly in reacting maleic anhydride with olefinic cracked petroleum distillate containing olefinic hydrocarbons boiling within the range of 50° to 200° C. and having from 4 to 12 carbon atoms per molecule but may also be utilized to good effect in connection with higher boiling olefin fractions containing up to 25 carbon atoms per molecule.

The use of olefinic mixtures substantially free from gums and oxygen compounds is an important feature of the invention. Olefinic mixtures contain substantial amounts of highly reactive material such as di-olefins which react relatively quickly to form gums and oxygen compounds when the mixtures are stored. We have discovered that such reaction products promote the formation of relatively large amounts of gum during condensation of the olefins with the maleic anhydride. Preferably, olefinic mixtures free from gums and oxygen compounds are obtained by distilling the mixtures just prior to use. By avoiding delay between distillation and use of the olefinic mixtures sufficient to permit the formation of gum and oxygen compounds, the formation of gums during the reaction is greatly reduced. For example, the amount of gums formed when using freshly distilled olefinic mixtures in accordance with the invention, ordinarily does not exceed 2 per cent based on the weight of the reaction mixture while use of olefinic mixtures which have been stored until substantial formation of gums and oxygen compounds takes place frequently results in the production during the reaction of 8 per cent or more of gummy material. Thus the invention substantially reduces waste of olefins and maleic anhydride.

By completely dissolving the maleic anhydride to form a substantially homogeneous solution thereof in the olefin mixture prior to raising the temperature of the mixture to the point where the reaction proceeds rapidly, i. e., above about 200° C., it has been found that the reaction may be carried out rapidly and smoothly without excessive maleic anhydride decomposition and waste, accompanied by large increases in pressure, such as have been experienced in reacting undissolved maleic anhydride with olefin mixtures. It may be noted that the reaction between olefins and maleic anhydride proceeds very slowly at temperatures of 150° to 200° C.

employed in the dissolution step so that the reaction does not proceed to substantial extent, i. e., less than from 10 to 20 per cent of the maleic anhydride is consumed while effecting dissolution. On the other hand, when the temperature is raised above 200° C., 50 to 90 per cent or more of the maleic anhydride is consumed within three hours.

For a further understanding of the invention, reference may be had to the accompanying drawings, in which—

Figures 1 and 2 are flow sheets illustrating diagrammatically arrangements of apparatus for synthesis of alkenyl succinic anhydrides batchwise and continuously, respectively.

Referring to Figure 1, reference number 1 designates a still equipped with a fractionating column 2 for fractionally distilling olefin-containing material of cracked petroleum origin introduced through inlet 3. 4 is a condenser for condensing the fractionated olefin vapors, and 5 is a receiver for the condensed olefins. Condenser 4 may be operated at a temperature sufficiently low to condense only hydrocarbons of the desired boiling point and receiver 5 may be provided with any suitable means such as valved outlet 6 for discarding uncondensed olefins of lower boiling point. Olefins recovered subsequently in the process may also be introduced into receiver 5 through valved conduit 6' as will be described later. Receiver 5 discharges through valved line 7 into autoclave 8 equipped with heating jacket 9. Molten maleic anhydride from any suitable source is introduced into the autoclave through valved conduit 11. Within the autoclave is mounted a gear pump 12, having an inlet 13 and an outlet 14, supported by drive shaft 16 extending through the upper end of the autoclave. The pump shaft may advantageously be of hollow construction for circulation therein of cooling liquid such as water.

Reference numeral 18 designates a valved outlet for gum formed in the autoclave during the reaction and 20 is a valved conduit through which the reaction mixture passes from the autoclave through condenser 21 to flash evaporator 22 which distills therefrom unreacted maleic anhydride and hydrocarbons. The flash evaporator is preferably of the continuous film type in which a film of the reaction mixture flows downwardly over a heated surface while the more volatile components of the mixture are vaporized. The vapors are condensed in the condenser 24 and the maleic anhydride is removed at 26 for re-use; by maintaining the condensate from condenser 24 at about 55° C., i. e., above the melting point of maleic anhydride, the anhydride may readily be drawn off at 26 in molten condition. The olefinic hydrocarbons containing some dissolved maleic anhydride may be conducted through line 6' to receiver 5 for re-use or through valved line 27 to storage. A portion of the hydrocarbons are bled off at 28 and discarded; the hydrocarbon bleed may be cooled, e. g., to about room temperature, say 15° C. and filtered in order to crystallize and recover a substantial portion of the anhydride dissolved therein. The crude alkenyl succinic anhydride from flash evaporator 22 is conducted to still 30 in which it is distilled under reduced pressure and the relatively pure alkenyl succinic anhydride vapors condensed and recovered in condenser 32.

Figure 2 shows an arrangement for continuous synthesis of alkenyl succinic anhydrides. In this figure reference numeral 35 designates a reservoir for olefins which is supplied with freshly distilled olefin stock from a still such as still 1 of Figure 1 and with recycled olefins which are recovered from the reaction product as described hereinafter. 37 is a reservoir for molten maleic anhydride and the anhydride and olefin mixture are pumped by pumps 40 through conduits 38 and 39 into coil 39' of dissolver 41. The coil is of about the same diameter as conduits 38 and 39. The dissolver and coil are jacketed to permit maintenance of a temperature of from 150° to 200° C., preferably 175° to 200° C. therein. The dissolver may be equipped with any suitable stirrer for promoting circulation of the olefins and the maleic anhydride therein, e. g., a pump 43 having an inlet 44 and outlet 45 identical with the gear pump 12 of Figure 1. The maleic anhydride is substantially completely dissolved in the olefins during passage through the heated coil 39' and during circulation in the dissolver. The dissolver is equipped at the bottom with a valved outlet 42 through which the small gum deposits which form may be removed from time to time. From the dissolver the hydrocarbon solution of maleic anhydride is conducted through conduit 47 to reactor 50 equipped with a heating jacket (not shown) for maintaining a temperature of 225° to 250° C. within the reactor. As shown in the drawings, the reactor 50 may be provided from end to end with a spiral member 52 defining a spiral path through which the reaction mixture passes in order to minimize mixing of contents of the reactor lengthwise thereof. Alternatively, the reactor may be constructed as a series of pipes of relatively small diameter, e. g., 0.25 to 2 inches, mounted in tube sheets in a shell equipped with headers at each end, the shell containing heating liquid surrounding the tubes. The reactor continuously discharges through outlet 54 into a flash evaporator 56 which vaporizes unreacted hydrocarbons and maleic anhydride.

These vapors are condensed in condenser 58, separated in separator 60 and the maleic anhydride recycled to maleic anhydride receiver 37 through conduit 64. Separator 60 and conduit 64 are preferably maintained at a temperature above the melting point of maleic anhydride, say about 55° C., so that the anhydride may be circulated in molten condition. A portion of the hydrocarbons may be continuously bled off and discarded at 63 and the remainder recycled to reservoir 35 through conduit 62; a substantial portion of the maleic anhydride dissolved in the discarded hydrocarbons may be recovered by cooling the hydrocarbons to about 15° C. to crystallize the anhydride and separating the crystals by filtration. The crude reaction product from the flash evaporator 56 is conducted to still 66 which communicates with condenser 67, a second fractionating still 68 and condenser 70. The stills and condensers are operated under reduced pressure, e. g., pressure of 10 to 30 mm. of mercury or less. The alkenyl succinic anhydrides are vaporized in still 66 leaving the higher boiling reaction products as residue and the distillate is condensed in condenser 67. The condensate is refractionated in still 68 to separate the more volatile materials including some maleic anhydride and olefin vapors from the alkenyl succinic anhydrides, which remain as residue. Vapors from still 68 are cooled to about 0° C. in condenser 70 to condense the maleic anhydride and olefins which are then separated from the non-condensable gases in separator 72 and pumped by pump 74 to separator 60 for recirculation to reservoirs 35 and 37. The presence of olefins and maleic anhydride in the vapors from still 68 is due chiefly to decomposition of the residues in still 66. It will be appreciated that the batch system of Figure 1 may include an arrangement such as elements 70, 72 and 74 for recovery of maleic anhydride and olefins evolved during distillation of the alkenyl succinic anhydrides.

The following examples are illustrative of the invention:

*Example 1*

This is an example of the batch process utilizing the apparatus of Figure 1. A cracked petroleum fraction constituted chiefly of aliphatic mono-olefins containing from 3 to 14 carbon atoms per molecule and smaller amounts of paraffins, di-olefins, dissolved gases such as methane and water, was fractionally distilled in still 1. A water-hydrocarbon distillate came over first and was condensed and separated into layers, the water layer discarded and the hydrocarbon layer returned to the still. When the water no longer formed a separate layer but merely imparted turbidity to the distillate the hydrocarbon was filtered to remove emulsified water and fractionation was continued. A fraction boiling within the range of 80° to 100° C. comprising about 81 per cent by weight of aliphatic mono-olefins containing from 6 to 8 and an average of about 6.8 carbon atoms per molecule, and the remainder chiefly paraffins and di-olefins was collected. About 102 parts by weight of this freshly distilled fraction and about 18 parts by weight of molten maleic anhydride were charged into the autoclave 9 to produce therein a mixture containing about 15 per cent by weight of maleic anhydride and about 85 per cent of hydrocarbons. The mixture was heated in the autoclave to 175° C. for one hour while operating the pump 12 to circulate the hydrocarbons and maleic anhydride; complete dissolution of the maleic anhydride in the hydrocarbons was effected during this period. Separation of the hydrocarbons and maleic anhydride into layers during the dissolution and reaction periods tends to promote gum formation. Circulation of the mixture during these periods not only promotes dissolution but prevents the formation of such layers.

The temperature in the autoclave was then raised to 225° C. and maintained at this point for two hours, i. e., until about 90 per cent of the maleic anhydride present in the autoclave charge was consumed. The autoclave was maintained under 275 pounds of pressure per square inch during the dissolution and reaction periods, i. e., under sufficient pressure to maintain the reactants in the liquid phase. The gum formed during the reaction settled to the bottom of the autoclave and was removed through valved outlet 18. The remainder of reaction mixture was then emptied from the autoclave through condenser 21 which cooled the mixture sufficiently to maintain the hydrocarbons and the maleic anhydride in the liquid phase. The mixture was passed to flash evaporator 22 where the unreacted hydrocarbons and maleic anhydride were driven off, condensed in condenser 24 and separately collected at 26 and 27. The crude alkenyl succinic anhydride product from the flash evaporator was passed to still 30 where it was distilled at 150° to 200° C. under pressure of about 4 to 6 mm. of mercury and the alkenyl succinic anhydride vapors were condensed and collected in condenser 32.

The above run was repeated until a cycle of 6 substantially identical runs had been carried out. Thereafter cycle 2 of 5 runs was carried out utilizing in each run one-fifth of the olefins recovered during the first cycle. Cycle 2 was followed by cycle 3 constituted of four runs in which one-fourth of the olefins recovered during cycle 2 were employed in each run. In cycle 5, two runs were made, each run utilizing one-half of the olefins recovered during cycle 4, and cycle 6 involved one run in which all the olefins recovered during cycle 5 were employed. For each run sufficient maleic anhydride was introduced into the autoclave to furnish about 15 per cent by weight of the autoclave charge. In cycles 4, 5 and 6 a reaction period of three instead of two hours at 225° C. was employed. Otherwise, all of the runs were carried out in substantially the same manner. The following tabulation is a summary of the results obtained during the twenty-one runs constituting the six cycles (parts are given by weight):

|  | Cycle | | | | | |
| --- | --- | --- | --- | --- | --- | --- |
|  | 1 | 2 | 3 | 4 | 5 | 6 |
| No. of runs per cycle | 6 | 5 | 4 | 3 | 2 | 1 |
| Reaction time, hours | 2 | 2 | 2 | 3 | 3 | 3 |
| Autoclave input: | | | | | | |
| Hydrocarbons | 102.40 | 85.86 | 72.33 | 59.76 | 50.12 | 41.96 |
| Maleic anhydride | 18.08 | 16.31 | 13.93 | 11.88 | 9.52 | 7.97 |
| Autoclave output: | | | | | | |
| Separated gum | 3.26 | .19 | .15 | .00 | .00 | .00 |
| Remainder | 115.73 | 100.78 | 85.00 | 70.61 | 58.44 | 48.96 |
| Flash evaporator: | | | | | | |
| Input | 115.73 | 100.78 | 85.00 | 70.61 | 58.44 | 48.9 |
| Recovered hydrocarbon with dissolved anhydride | 86.80 | 73.11 | 60.70 | 50.66 | 42.36 | 36.66 |
| Recovered maleic anhydride | 0.10 | 2.92 | 1.57 | 1.29 | 0.52 | 0.85 |
| Still 30: | | | | | | |
| Input | 28.22 | 23.20 | 22.25 | 18.38 | 15.16 | 10.98 |
| Alkenyl succinic anhydrides | 24.50 | 19.40 | 18.22 | 15.20 | 13.54 | 9.14 |
| Still residue | 3.07 | 3.52 | 3.66 | 2.54 | 1.52 | 1.55 |

It will be observed that employing 102.4 parts by weight of the olefin fraction and 74.09 parts by weight of maleic anhydride in the production of 100 parts by weight of alkenyl succinic anhydrides there was a loss of only 3.6 parts by weight of reactants in the formation of autoclave gum, of which somewhat less than 50 per cent was of maleic anhydride origin. It will also be noted that the formation of gum was concentrated largely in the first cycle, i. e., the recycled hydrocarbons tended to form little or no gum. By utilizing a reaction mixture containing about 85 per cent by weight of hydrocarbon and about 15 per cent by weight of maleic anhydride and completely dissolving the anhydride in the hydrocarbons at about 175° C. before heating the reaction mixture to 225° C., the reaction proceeded smoothly and rapidly at the higher temperature at relatively uniform pressures. Sharp increases in pressure within the autoclave such as take place when a mixture of olefinic hydrocarbons and undissolved maleic anhydride are heated under pressure above 200° C. did not occur.

Instead of storing the olefin stock recovered from condenser 24 until the end of the plurality of runs before recycling it to the autoclave, it may be desirable in many cases to recycle the recovered hydrocarbons directly to the receiver 5 and thence together with freshly distilled olefinic petroleum hydrocarbons into the succeeding autoclave charge. Operating in this manner, each autoclave charge, except the first, contains a mixture of freshly distilled olefins and olefins recovered from a preceding run.

Example 2

This is an example of the continuous process employing the arrangement of apparatus disclosed in Figure 2. A mixture of the freshly distilled olefin stock hereinabove described in Example 1, and recycled olefin stock containing a little dissolved maleic anhydride is continuously pumped from reservoir 35 to dissolver 41 and molten maleic anhydride is pumped to the dissolver from reservoir 37 in proportions to maintain a ratio of about 85 parts by weight of hydrocarbons to 15 parts by weight of the anhydride in the dissolver. The dissolver is maintained at about 175° C. and under a pressure of from 200 to 275 pounds per square inch and continuous circulation of the hydrocarbons and maleic anhydride therein is secured by the operation of pump 43. The small amounts of gum which form in the dissolver tend to settle to the bottom thereof and are removed from time to time through valved outlet 42. A solution of about 15 parts by weight of the anhydride and about 85 parts by weight of the hydrocarbons is continuously introduced from the dissolver into reactor 50 which is maintained at a temperature of about 225° C. and under pressure of from 200 to 275 pounds per square inch, the rate of introduction being regulated so the passage of the mixture through the reactor requires about 3 hours. The reaction mixture from the reactor is continuously discharged to flash evaporator 56 where the unreacted maleic anhydride and hydrocarbons are vaporized at a temperature of about 245° C. following which they are condensed in condenser 58 and separated in separator 60; the separated maleic anhydride is recycled in molten condition through conduit 64 to reservoir 37 and a portion of the hydrocarbons is bled off at 63, cooled and filtered to separate maleic anhydride crystals and discarded. The remainder of the hydrocarbons containing a little dissolved maleic anhydride is recycled to reservoir 35. The unvaporized material including alkenyl succinic anhydrides, gums, etc., passes from the flash evaporator to still 66 where the anhydrides are distilled off under reduced pressure, e. g., 10 to 30 millimeters of mercury, leaving the gum and other non-volatile material in the still as residue. The alkenyl succinic anhydride vapors are condensed in condenser 67 and the condensate is fractionally distilled in still 68 under pressure of 10 to 30 mm. of mercury to separate maleic anhydride and olefins therefrom leaving the desired anhydrides as still residue. The vapors from still 68 are conducted to condenser 70 operated under pressure of about 10 to 30 mm. of mercury at 0° C. where the maleic anhydride and hydrocarbons are condensed. The anhydride and hydrocarbons are separated from non-condensable gases in separator 72 and pumped to separator 60 from which they are recycled to reservoirs 35 and 37.

Operating in accordance with this example, the production of 2,000 parts by weight of alkenyl succinic anhydrides requires about 1850 parts by weight of the olefin fraction and about 1285 parts by weight of maleic anhydride. During the reaction about 685 parts by weight of hydrocarbons containing a little dissolved maleic anhydride are bled off at 63 and the residue from still 66 amounts to about 440 parts by weight. By utilizing freshly distilled olefins, the formation of gum in the reactor 50 is maintained low, usually not above about 2 per cent based on the total weight of the reactants. Furthermore, by completely dissolving the maleic anhydride in the hydrocarbons before introducing them into the reactor, smooth, rapid reaction of the maleic anhydride with the olefins is continuously accomplished without sharp increases in pressure which are experienced when mixtures of undissolved maleic anhydride and mixed olefins of cracked petroleum origin are heated above 200° C.

Thus it will be seen that the invention provides an improved process for reaction of mixed aliphatic mono-olefins with maleic anhydride rapidly and smoothly at relatively high temperatures with reduced waste of reactants due to side reactions resulting in gum formation. In the claims, the expression "freshly distilled olefin mixtures" or the equivalent is used to describe olefin mixtures which are distilled and are then, prior to substantial formation of gummy materials and oxygen compounds, reacted with maleic anhydride. Under ordinary commercial conditions in which the distilled olefins are placed in metal containers they should be used within about a few days after distillation is effected; storage for longer periods is likely to result in formation of gums and oxygen compounds which materially reduce the maleic anhydride efficiency. In some cases the period between distillation and use of the olefins may be somewhat prolonged by adding to the distilled olefins a gum and oxidation inhibitor such as diphenylamine, particularly if the olefins are kept in glass and not metal containers.

Since certain changes may be made without departing from the scope of the invention, it is intended the above shall be interpreted as illustrative and not in a limiting sense.

We claim:

1. A process for the synthesis of alkenyl succinic anhydrides from maleic anhydride and cracked petroleum hydrocarbon mixtures containing mono-olefins, which comprises distilling the cracked petroleum hydrocarbon mixture to obtain a product free from gums, oxygen compounds and water, mixing the freshly distilled product with an amount of maleic anhydride equivalent to 5% to 20% by weight of the resulting mixture, the amount of maleic anhydride being not in excess of that which will dissolve in the hydrocarbon mixture at a temperature between 150° and 200° C., completely dissolving said maleic anhydride in said hydrocarbon mixture by intimately commingling these ingredients at a temperature within the range of 150° to 200° C. for a time up to about two hours, then raising the temperature of the resultant solution to between 200° and 250° C. under sufficient pressure to maintain the olefins in a liquid phase to bring about reaction between the maleic anhydride and olefins, and recovering the alkenyl succinic anhydride product.

2. A process for the synthesis of alkenyl succinic anhydrides from maleic anhydride and cracked petroleum hydrocarbon mixtures containing mono-olefins, which comprises distilling the cracked petroleum hydrocarbon mixture to obtain a product free from gums, oxygen compounds and water, mixing the freshly distilled product with an amount of maleic anhydride equivalent to 5% to 20% by weight of the resulting mixture, the amount of maleic anhydride being not in excess of that which will dissolve in the hydrocarbon mixture at a temperature between 150° and 200° C., completely dissolving said maleic anhydride in said hydrocarbon mixture by intimately commingling these ingredients at a temperature within the range of 150° to 200° C. for a time between about 0.5 and about 2 hours, then raising the temperature of the resultant solution to between 200° and 250° C. under sufficient pressure to maintain the olefins in a liquid phase to bring about reaction between the maleic anhydride and olefins, and recovering the alkenyl succinic anhydride product.

3. A process for the synthesis of alkenyl succinic anhydrides from maleic anhydride and cracked petroleum hydrocarbon mixtures containing mono-olefins having from 4 to 25 carbon atoms per molecule, which comprises distilling the cracked petroleum hydrocarbon mixture to obtain a product free from gums, oxygen compounds and water, mixing the freshly distilled product with an amount of maleic anhydride equivalent to 5% to 20% by weight of the resulting mixture, the amount of maleic anhydride being not in excess of that which will dissolve in the hydrocarbon mixture at a temperature between 150° and 200° C., completely dissolving said maleic anhydride in said hydrocarbon mixture by intimately commingling these ingredients at a temperature within the range of 150° to 200° C. for a time between about 0.5 and about 2 hours, then raising the temperature of the resultant solution to between 200° and 250° C. under sufficient pressure to maintain the olefins in a liquid phase to bring about reaction between the maleic anhydride and olefins, and recovering the alkenyl succinic anhydride product.

4. A continuous process for the synthesis of alkenyl succinic anhydrides from maleic anhydride and cracked petroleum hydrocarbon mixtures containing mono-olefins, which comprises continuously mixing a freshly distilled cracked petroleum hydrocarbon mixture containing mono-olefins free from gums and oxygen compounds with an amount of maleic anhydride equivalent to from 5% to 20% by weight of the mixture, the amount of maleic anhydride being not in excess of that which will dissolve in the hydrocarbon mixture at a temperature between about 150° and about 200° C., continuously dissolving said maleic anhydride in said hydrocarbon mixture by intimately commingling these ingredients at a temperature between about 150° and 200° C. for a time up to about two hours, continuously passing the resultant solution through a reaction zone at a temperature of from 200° to 250° C. under sufficient pressure to maintain the olefins in a liquid phase to bring about reaction between the maleic anhydride and olefins, continuously withdrawing the reaction mixture from the reaction zone, separating unreacted olefins and maleic anhydride from the alkenyl succinic anhydrides formed during the reaction, and utilizing at least a portion of the unreacted olefins thus recovered together with additional mono-olefins for the dissolution of additional maleic anhydride.

MEARL A. KISE.
ROBERT F. ENGLE.